(12) United States Patent
Vandenberg

(10) Patent No.: US 6,273,028 B1
(45) Date of Patent: Aug. 14, 2001

(54) DAIRY FEEDING STANCHION HAVING FLIPPER LOCKING DESIGN

(76) Inventor: August Vandenberg, 1904 Trotter Trail, Norco, CA (US) 91760

( * ) Notice: Subject to any disclaimer, the term of this patent is extended or adjusted under 35 U.S.C. 154(b) by 0 days.

(21) Appl. No.: 09/517,712

(22) Filed: Mar. 2, 2000

(51) Int. Cl.[7] ................................................. A01K 1/06
(52) U.S. Cl. ................................................. 119/740
(58) Field of Search .................................. 119/739, 740, 119/741, 742, 738

(56) References Cited

U.S. PATENT DOCUMENTS

| | | | |
|---|---|---|---|
| 3,511,216 | 5/1970 | George | 119/745 |
| 4,150,638 | 4/1979 | Vandenberg et al. | 119/741 |
| 4,185,592 | 1/1980 | Albers, Sr. | 119/750 |
| 4,314,528 | 2/1982 | Fogleman | 119/740 |
| 4,377,131 | 3/1983 | Vandenberg et al. | 119/740 |
| 4,457,265 | 7/1984 | Anderson | 119/750 |
| 4,476,815 | 10/1984 | Albers, Sr. | 119/740 X |
| 4,495,897 | 1/1985 | Albers, Sr. | 119/740 X |
| 4,867,105 | 9/1989 | Hatfield | 119/740 |
| 4,930,452 | 6/1990 | Da Silveira | 119/740 |
| 4,976,224 | 12/1990 | Hatfield | 119/740 |
| 5,309,869 | 5/1994 | Albers, Jr. | 119/735 |
| 5,373,813 | 12/1994 | Da Silveira | 119/740 |
| 5,626,100 | 5/1997 | Stubbs et al. | 119/734 |
| 5,645,015 | 7/1997 | Da Silveira | 119/740 |
| 5,694,887 | 12/1997 | Vandenberg | 119/740 |
| 5,878,697 | 3/1999 | Hatfield | 119/741 |
| 5,887,549 | 3/1999 | Anderson | 119/743 |
| 6,082,306 | * 7/2000 | Hatfield | 119/740 X |

* cited by examiner

*Primary Examiner*—Robert P. Swiatek
(74) *Attorney, Agent, or Firm*—Cislo & Thomas LLP

(57) ABSTRACT

In stanchions of the type used for milking and/or feeding but primarily the feeding of cattle, a stanchion structure having vertically-spaced upper and lower horizontal members with swing pipes defining spaced positions for accommodating cattle in spaced, captive relationship and having intermediate vertical support posts, an improved structure is provided employing an extending turn bar having spaced depending posts, detents, or tabs, wherein locking flipper members are pivotally secured to each of the swing pipes so that the individual swing pipes may be selectively opened either individually or in unison to permit free access or egress from the spaced, cattle positions by the cattle and wherein the locking mechanisms are protected by the swing pipe structure so as to inhibit opening of the locking mechanism by cattle. The invention is also directed to a conversion kit for existing stanchion structures to provide for the locking feature in a simple and economically feasible manner.

10 Claims, 5 Drawing Sheets

DAIRY FEEDING STANCHION HAVING FLIPPER LOCKING DESIGN

BACKGROUND OF THE INVENTION

1. Field of the Invention

This invention relates to cattle stanchions, and more particularly to cattle stanchions that close automatically to captively retain cattle.

2. Description of the Related Art

In the cattle industry, occasions arise wherein it is necessary and desirable to provide spaced positions, stalls or stations to be occupied by cattle wherein the cattle are retained in those positions in a captive manner. The most prominently occasioned instance, wherein cattle are retained in spaced stations, is wherein cattle are fed on an intermittent basis and it is desired to feed each individual animal a metered or allocated amount. To ensure that each individual animal obtains its fair share and no more or no less than other of the animals, some of which may exhibit aggressive tendencies in feeding, it becomes necessary to provide stanchions in order to captively retain each individual animal in a selected position during feeding or other process which is to be individually accomplished on each of the animals.

The most common means of ensuring appropriate feeding of cattle is by the utilization of stanchion devices wherein the stanchions provide individual places or positions which are occupied by an individual animal and wherein the individual animal is locked in that position or retained in a captive relationship with regard to the stanchion. The stanchions ordinarily employ upper and lower horizontal members having spaced swing bars affixed therebetween with adequate support posts to support the stanchions and wherein the swing bars when in the open position, define spaced openings or positions into which an individual animal may enter for feeding and/or other purposes. Once the swing bar is moved to the closed position, the individual animal's head is retained captively within the stanchion structure and cannot remove its head prior to the stanchions or more specifically, the individual swing bars, being opened. Some animals are skittish or fearful of being approached by human beings and thus, once they have entered and occupied a spaced position, the swing bar may not be able to be closed without frightening the animal which would withdraw from the occupied position and not be captively retained therein. In other instances, in order to conserve on the amount of human labor, it is desirable to be able to open a plurality of swing bars at one time by a single actuator member to accomplish this purpose from a point removed from and central to the plurality of stanchions involved.

Various self-locking stanchions have been proposed utilizing single actuator members whereby the swing bars may be opened in unison but for the most part, such stanchion structures have been either complicated, expensive to build and install, or have been deficient in the respect that individual cattle retained in the individual stanchions were able to open the individual locking mechanisms, thereby defeating the intent and purpose of such stanchion structures. With the herein disclosed invention, a locking stanchion is provided which is incapable, for all intents and purposes, of being opened by cattle, whether intentionally or inadvertently, and wherein an existing stanchion structure may be easily modified to provide a stanchion construction having the attributes of the herein disclosed invention. Additionally, the stanchion structure of this invention provides simple, straightforward means of assuring selective, captive retention of cattle in a stanchion structure for feeding or other purposes and wherein the individual swing bars making up the stanchion structure may be individually operated or operated in unison to be moved into the open or the closed position.

SUMMARY OF THE INVENTION

In an exemplary embodiment, the invention is directed to a multiple stanchion construction having vertically spaced upper and lower horizontal support members, intermediate vertical support posts and spaced swing pipes defining spaced positions for accommodating cattle in spaced, captive relationship. A turn bar extending the length of and cooperatively supported relative to said upper horizontal support member and from each of the said spaced swing pipes, is provided. A plurality of spaced locking tabs is provided on said turn bar adjacent each of said swing pipes and a locking, or trapping, member is pivotally supported from the upper termini of each of said swing pipes. The swing pipes and cooperating locking members are selectively positionable in a locked and unlocked position with each of said terminii of said swing pipes having a structural configuration to at least partially overlie each of said locking members. Actuator means is provided for circular movement of said turn bar to simultaneously release each of said swing bars having its associated locking member in the engaged position with said adjacently positioned tab of said turn bar for movement into the unlocked position.

In the present invention, a stanchion locking system is described that allows automatic but individual locking of stanchions that are actuated by individual cattle. Ensemble release of captively-retained cattle is effected by rotating an actuating turn bar. Swing bars, biased by gravity, automatically open when released by the turn bar.

The swing bars terminate in a flipper-based locking mechanism, member, or system that cooperatively engages the downwardly-depending tabs of the rotatable turn bar. The flipper-based locking mechanism engages a corresponding depending tab when a cow lowers its head through one of the stanchions.

The cow is freed by disengaging the depending tab from the locking mechanism. The depending tab disengages the locking mechanism by rotating the turn bar or by manual engagement of a flipper as by a cowhand. Rotating the turn bar releases all swing bars simultaneously, thereby releasing all captively-retained cattle at the same time. Manual engagement of the locking mechanism allows selective release of individual cows. Such selective release is particularly advantageous for isolating a specific cow for medical treatment, transport, and/or other separation from the herd.

The stanchion of the present invention allows fallen cattle to stand up more easily. By selectively allowing further opening of the cattle-receiving station, a fallen cow is given additional room by which it can regain its footing. This can only happen with the turn bar in the release position.

OBJECTS OF THE INVENTION

It is an object of the invention to provide a multiple stanchion construction for selectively and captively retaining cattle at feeding stations and the like.

It is an object of the present invention to provide a multiple stanchion construction for automatically capturing and selectively freeing cattle at feeding stations and the like.

It is another object of the present invention to allow automatic capture and ensemble release of cattle at feeding stations and the like.

It is another object of the invention to provide a stanchion construction wherein the swing bar is movable into the closed and locked position and which is not easily opened by cattle.

It is another important object of the invention to provide a stanchion construction which is easily modified to utilize locking members to captively and is selectively retain cattle which is not easily, inadvertently or unintentionally releasable to permit egress by cattle.

It is still another more important object of the invention to provide a multiple stanchion construction employing a plurality of swing bars for captively retaining cattle in spaced relationship wherein the swing bars are locked in position and may be actuated to open in unison or may be individually actuatable to release cattle at one or more of the spaced positions.

It is still another even more specific and important object of the invention to provide a stanchion construction utilizing a swing bar wherein a locking system is retained on the terminus of the swing bar in a manner so that the locking member is at least partially shielded so as to inhibit and prohibit opening of the locking member by cattle.

It is an even further still more important specific object of the invention to provide a stanchion construction which is adaptable to existing stanchion constructions in order to make the swing bars thereof locking and non-releasable so as to captively and selectively retain cattle within the station defined by the stanchion construction.

It is an even further, still more specific object of the invention to provide a locking system for a stanchion structure employing a rotatable turn bar wherein the turn bar has spaced depending locking tabs, posts, or detents and wherein a locking member or system is normally urged into contact with such turn bar and/or tab in order to effectively retain in secured and locked relationship a swing bar making up the stanchion construction.

These and other objects and advantages of the present invention will be apparent from a review of the following specification and accompanying drawings.

DESCRIPTION OF THE PREFERRED EMBODIMENT(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
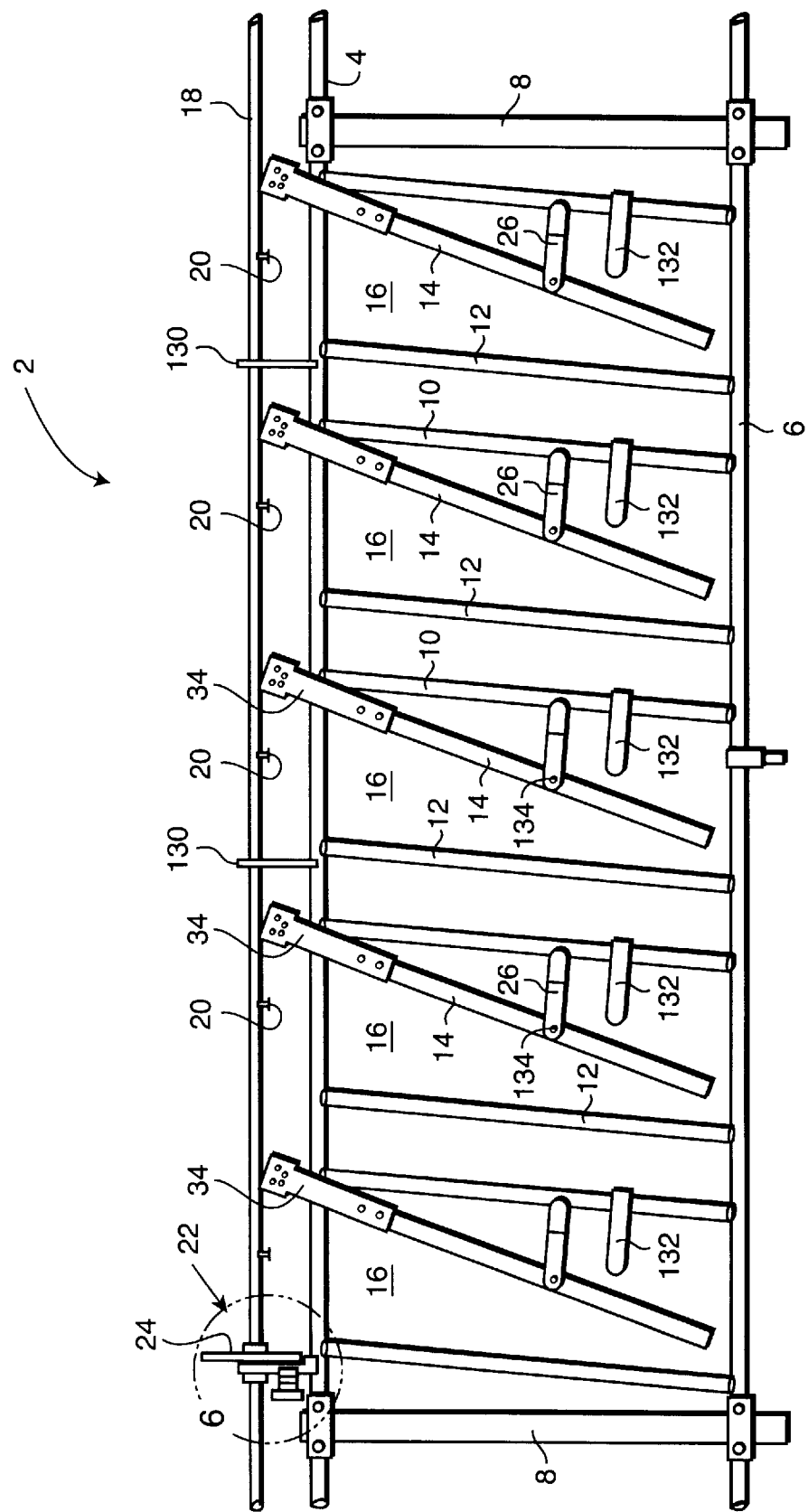
FIG. 1 is a fragmentary view of one of the embodiments of the invention showing all swing bars in the open or cattle-receiving position.

Referring to the drawings wherein like numerals of reference designate like elements throughout, and referring specifically to FIG. 1, the stanchion construction 2 of the invention is illustrated in somewhat diagrammatic form, it being understood that while only five cattle receiving stations are illustrated, that there is contemplated a plurality of such stations and that the invention as described will be applicable to such additional stations in that the structures specifically shown and described may be modified accordingly. In the stanchion structure 2 as illustrated, it will be noted that a conventional stanchion structure employing spaced upper horizontal member 4 and lower horizontal member 6 conventionally supported, for example, from vertical support member 8 embedded in concrete or the like, and having spaced vertical swing bar support members 10 and rigidly secured vertical posts 12 with adjacently positioned swing bars 14, defining therebetween spaced cattle receiving stations 16, is illustrated.

Swing bar members 14 are pivotally mounted so as to pivot above their lower ends as they are pivotably secured to swing bar spacer member 26 and movable between the open or cattle receiving position shown in FIG. 1 and the closed or cattle-retaining position. The stanchions as shown in FIG. 1 are positioned such that one would be looking at the heads of the cattle within the stations 16. Swing bars 14 are illustrated as being tubular in configuration but obviously other shapes may be utilized and while the upper horizontal member 4 is shown as tubular in shape, in actual practice and in most instances, this member may be rectangular or pipe shaped.

Extending through the station positions 16 is elongate turn bar 18, which may be cylindrical, having spaced tabs 20 corresponding in number to the number of swing bars 14 defining the number of cattle receiving stations 16. At one end or the other is provided an actuator means 22 comprising offset turning handle 24 connected to turn bar 18 so as to circularly move turn bar 18 between a first and second position, which correlates to the trap and release position of swing bars 14.

That is, the terminus 32 of each swing bar 14 is provided with lock, or trap, box mechanisms generally designated 34 employing a trapping mechanism generally designated 36 which co-acts with the individual spaced tabs 20 to thereby lock swing bar 14 in the closed position. Thus, once engaged, the individual locking members 36 cause the individual swing bars 14 to lock into place, closing the cattle-receiving station 16. Each of the swing bars 14 moves independently save when the trapping mechanism 36 engages the corresponding tab 20 on the turn bar 18. While all cattle-receiving stations 26 may be released simultaneously, each one is closed individually. Thus, all of the swing bars upon movement of the turn bar by means of actuator 22 will move in unison to the open cattle-receiving position.

Figure 2:
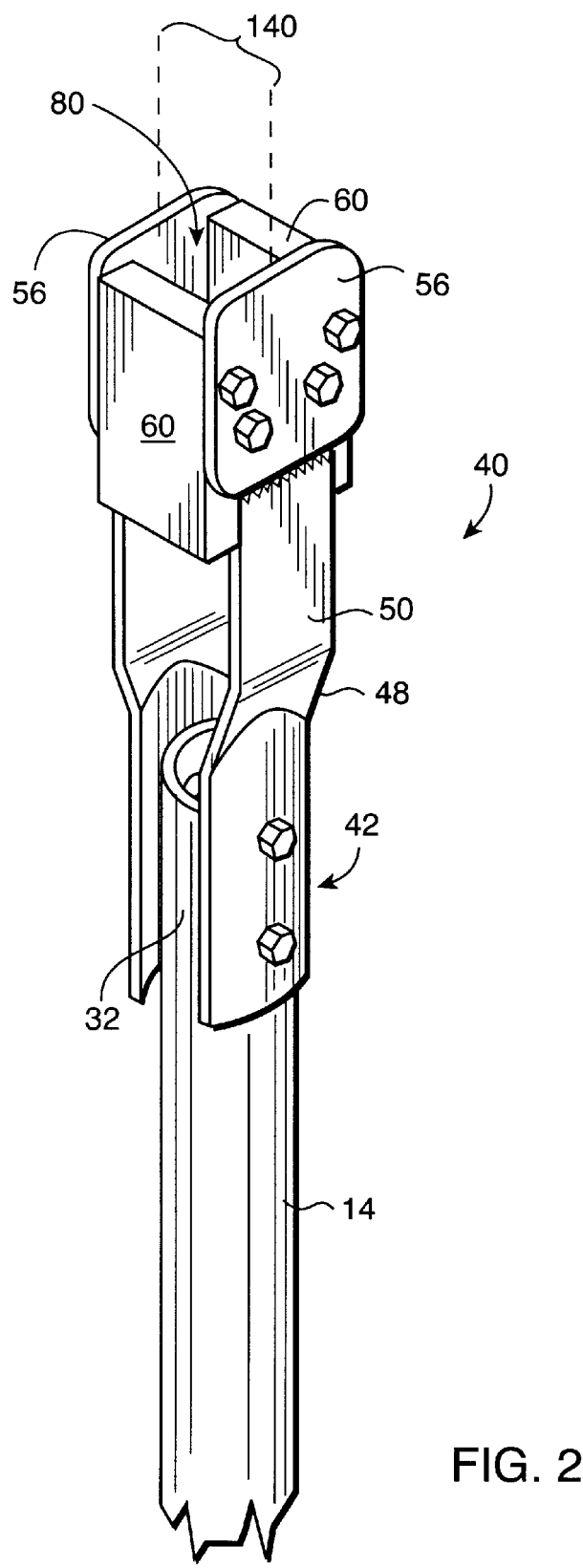
FIG. 2 is a fragmentary view of one embodiment of the invention, illustrating a locking, or trapping, terminus of a swing bar.
Figure 3:
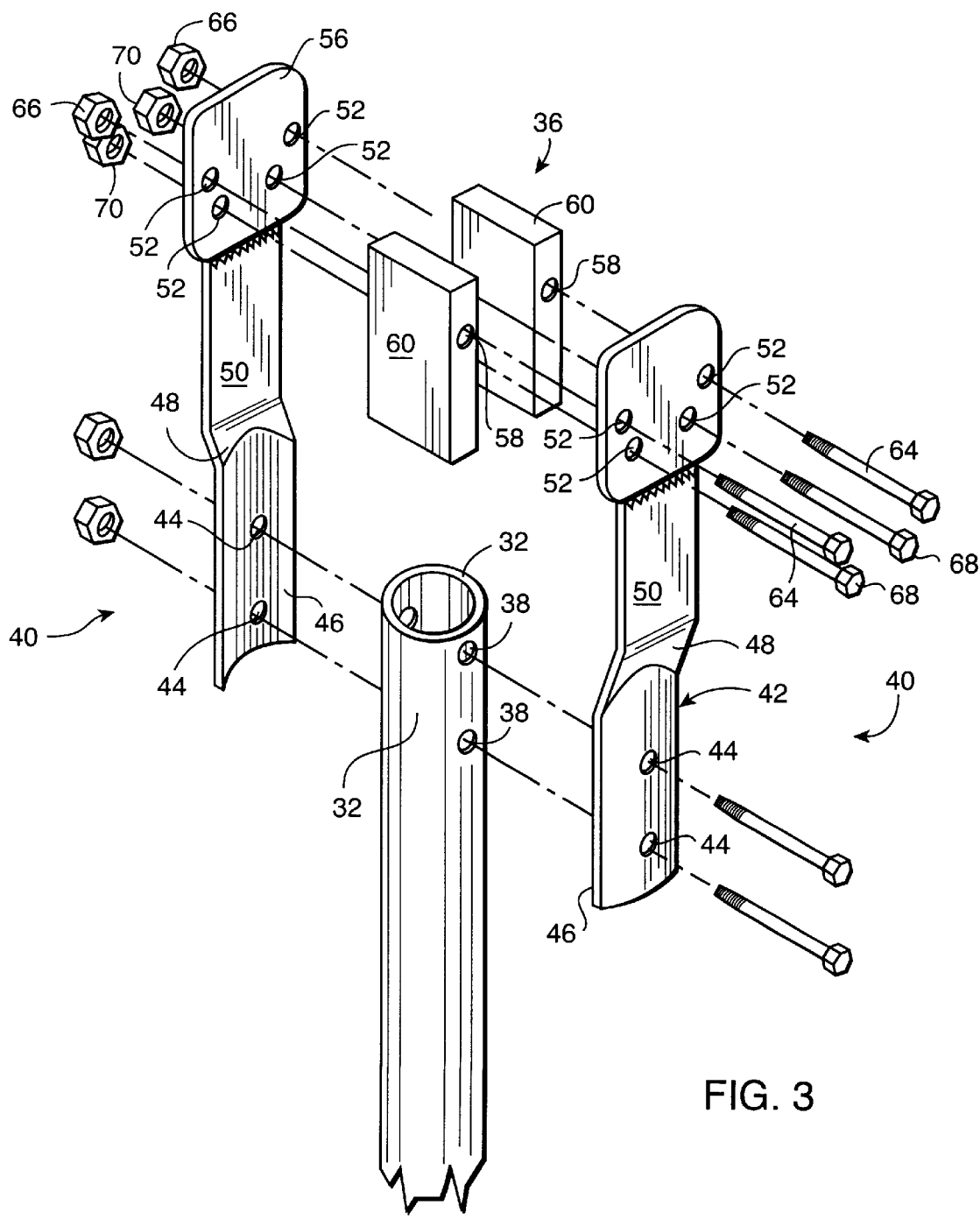
FIG. 3 is an exploded view similar to FIG. 2 showing the individual elements.

Referring to FIGS. 2 and 3, the more specific details of the invention will be seen. The terminus 32 of each of the individual swing bars 14 is provided with spaced through bores 38 in order to receive on either side upstanding ear members 40 having a lower portion 42 having spaced holes 44 in spaced alignment with through bores 38 and having contoured surface 46 so as to fit snugly to the exterior surface of terminus 32 of swing bar 14.

Integral with the lower portion 42 of ear members 40 are inner set portions 48 extending upwardly to straight run portion 50, having spaced apertures 52 and having a widened end 56 to receive therebetween flipper blocks 60, which serve as the trapping, latching, or locking member 36. In this particular instance, each flipper block 60 has a through bore 58 and is retained in position by a through bolt 64 and nut 66. Through bolts 68 are disposed through and connect the two widened ends 56 and are retained in place by nuts 70.

The second set of through bolts 68 serve to hold the two flipper blocks 60 apart and thereby to provide entrapment of the tab 20 by the trapping mechanism 36. As each flipper block 60 pivots upon its through bolt 64, it could allow the release of the entrapped tab 20 by rotating in a direction opposite to that occurring when the tab travels into the tab space 80 present between the two flipper blocks 60.

The through bolts 68 prevent rotation of the flipper blocks 60 that would allow unintentional release of the swing bar 14. The flipper stop bolts 68 may be positioned relative to the flipper bolts 64 so that each flipper 60 is generally perpendicular to the horizontal. Perpendicular flipper blocks 60 provide better entrapment of the depending tab 20 as a higher barrier is present for the tab 20. The flipper stop bolts 68 may then be spaced approximately one-half of the width of a flipper block 60 from the flipper bolts 64. The flipper stop bolts 68 are spaced downwardly away from the flipper bolts 64 to better stop the flipper block 60 from rotating in a tab-releasing direction.

In the assembled form as seen in FIG. 2, it should be noted that the locking, or trapping, member 36 is only brought into contact and engagement with turn bar member 18 when the cattle-receiving station is closed. Upon engagement of the turn bar 18 with the swing bar 14 and positioning of the tab 20 in the trapping member 36, the trapping member 36 will assume the position shown in FIG. 2 save that the depending tab will be locked between the two flipper blocks 60. Circular movement of the turn bar 18 will remove the depending tab 20 from between the two flipper blocks 60. The swing bar 14 then swings clear of the turn bar 18, opening the cattle-receiving station 16 and releasing any captively-retained cow. If release of an individual cow should be desired, it is simply obtained by rotating the obstructing flipper block 60 to disengage the tab 20, thereby permitting pivotal movement of the swing bar 14. It should be understood that each of the individual swing bars 14 may be so selectively and independently released or, as indicated, once the locking member 36 of each of the swing bars 14 is in the locked or latched position with the turn bar 18, circular movement of the turn bar 18 as by means of the actuating mechanism 22 will release all of the swing bars so locked or latched in unison in cooperation with turn bar 18.

It should be noted that the structural configuration of the upstanding ear members 42 is such that the widened ends 56 protect the sides of at least a portion of the locking mechanism, and in particular, the locking member 36. This prevents adjacently positioned cattle from intentionally or inadvertently unlocking the individual swing bar member 14 to permit an otherwise captive cow from egressing from a particular station 16. Additionally, the generally 90° angle a flipper block 60 must make generally prevents unintentional, inadvertent unlocking as might occur with vigorous head movements of the individual cows retained within the stations 16.

Figure 4:
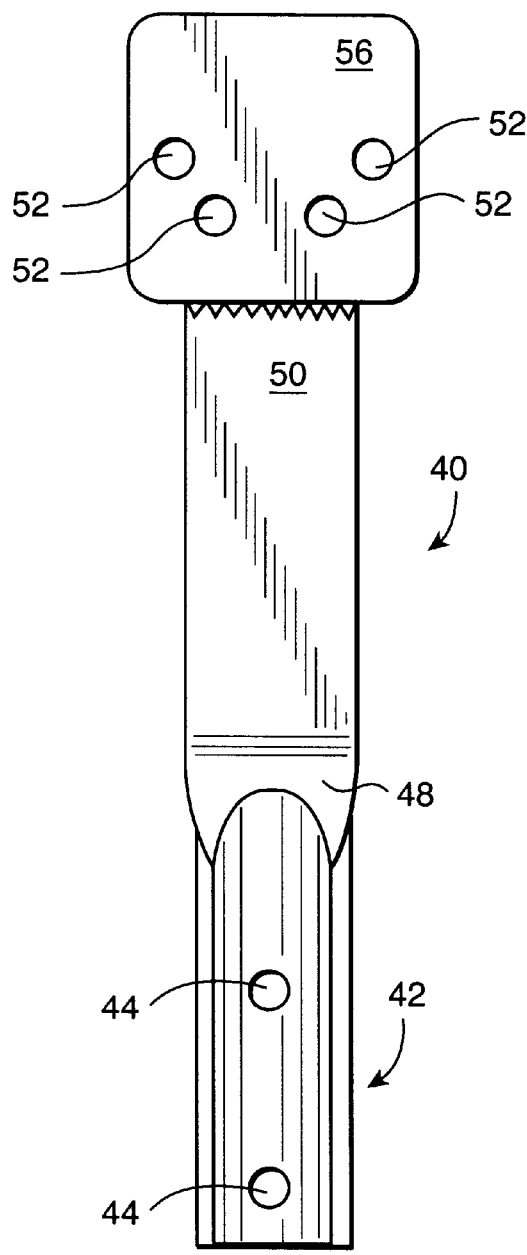
FIG. 4 is a front view of the upstanding ear member.
Figure 5:
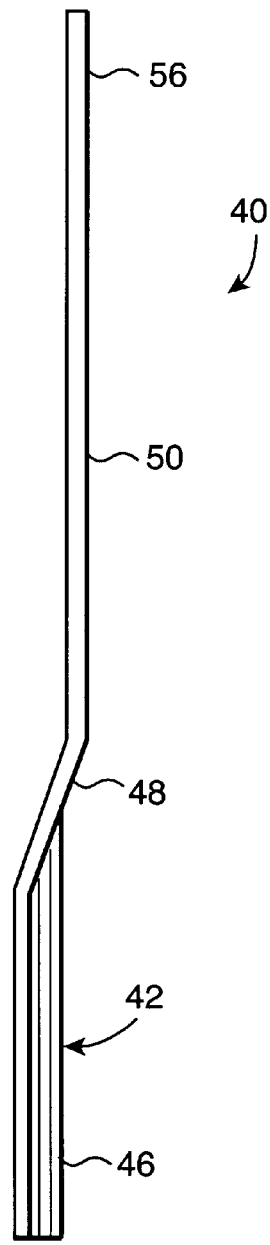
FIG. 5 is a side view of the upstanding ear member of FIG. 4.

FIGS. 4 and 5 show separate and distinct side views of the upstanding ear member 42.

Figure 6:
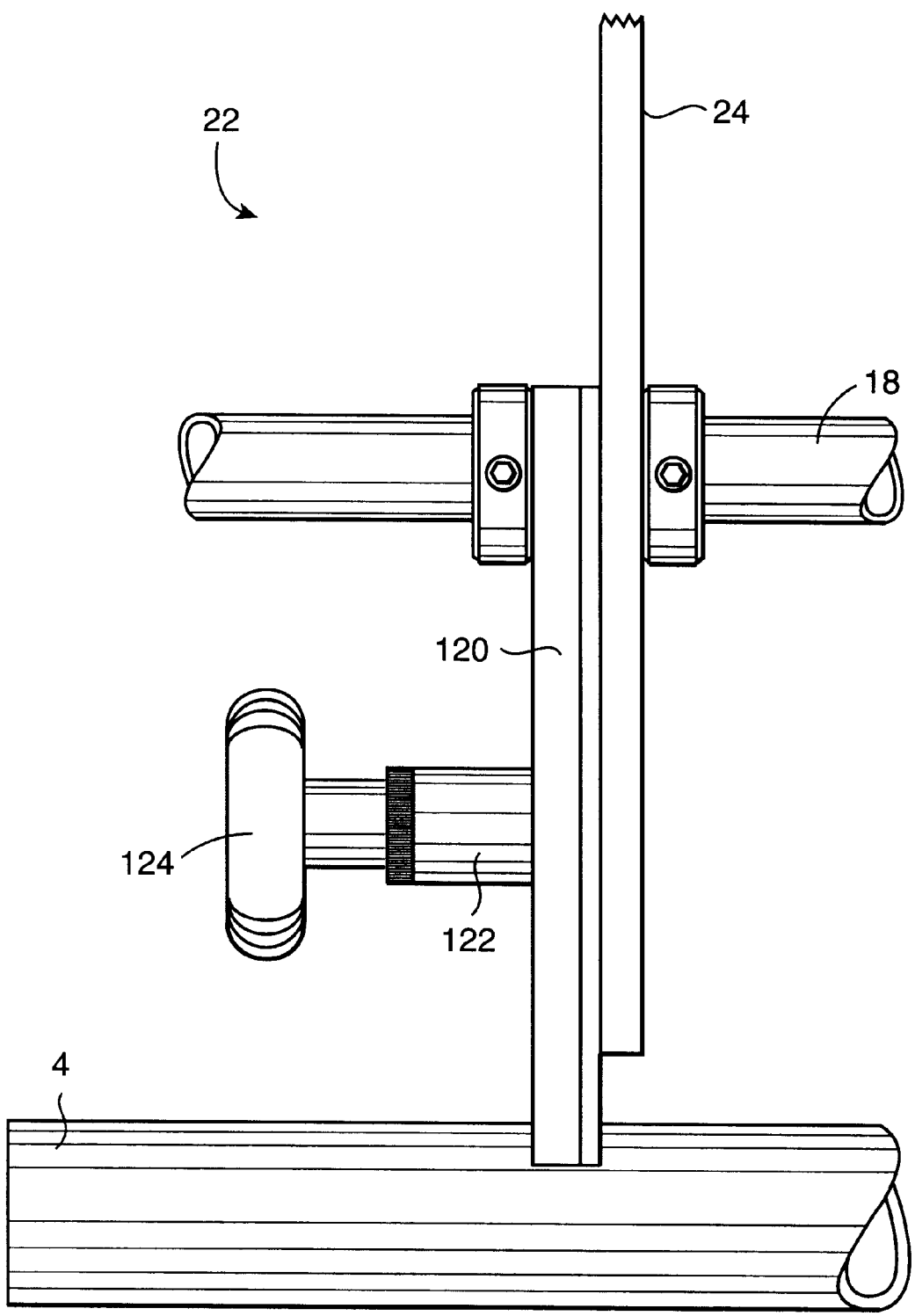
FIG. 6 is a fragmentary view of the turn bar activator as indicated by circle 6 of FIG. 1.

FIG. 6 is an enlarged view of the actuator mechanism 22 as indicated by circle 6 of FIG. 1. The actuator mechanism 22 is coupled to the spaced upper horizontal member 4 for stability, and in order to control the turn bar 18.

A mounting bracket or foundation 120 extends upwardly from the horizontal member 4. The mounting bracket 120 provides a housing 122 for a spring-biased latching knob 124. The spring-biased latching knob 124 is spring-biased towards the offset handle 24 and passes therethrough through an aperture (not shown) present in the offset handle 24. When a pin present at the end of the spring-biased latching knob 124 passes through the offset handle aperture, the offset handle is locked into place and cannot be moved. When the offset handle 24 is so locked into place, the depending tabs 20 are generally in a downward position so that they may engage the locking members 36 of the swing bars 14.

In order to turn the turn bar 18 and thereby release all of the latched swing bars 14, the spring-biased latching knob 124 is pulled away from the handle 24. The knob's pin is then removed from the handle aperture, and the handle is free to rotate the turn bar 18. In so doing, the depending tabs 20 are turned away from their entrapped position between the two flipper blocks 60 of the locking mechanism 36. Once the depending tabs turn free of the locking mechanism 36, gravity pulls the swing bars 14 to the open position, allowing any captively-retained cattle to remove themselves from the cattle-receiving station 16.

The offset handle 24 may control a turn bar 18 of a great length. So long as the operator of the handle 24 can effectively pivot the turn bar 18, any number of stanchions may be coupled to the offset handle 24. Generally, due to the nature of the latching knob 124, a single handle 24 should be used for the associated cattle stanchions. As shown in FIG. 1, supports 130 for the elongate turn bar 18 may be present every two stanchions or so.

As can be inferred from the description above, the width of the flipper blocks 60, and generally the distance between the individual upstanding ears 40 and the widened sections 56 thereof are sufficient to allow the proper turning of the turn bar 18 to rotate the depending tab 20 out from between the inter-flipper block distance 80 of the locking mechanism 36. Generally, this distance between the widened sections 56 of the upstanding ears 40 is indicated by reference number 140 and is approximately the diameter width of the turn bar 18 plus the distance the depending tab 20 projects away from the turn bar 18. This is the minimal distance if the turn bar 18 is located to one side of the locking member 36. In such an offset position, the turn bar 18 can only be turned in one direction. If the turn bar 18 is to allow release of the swing bars 14 in both directions, the turn bar 18 may be centrally located between the two upstanding ears 40. If the turn bar 18 is centrally located between the two upstanding ears 40, then the widened portions 56 must be a distance of at least one depending tab away from the turn bar 18.

A swing bar guide and stop 132 allows free securement of the swing bar 14 when it is placed in the position to release a fallen cow. The swing bar 14 may be swung further over to the left with respect to FIG. 1 so that the bottom end of the swing bar travels further from the vertical post 12. This gives a fallen cow more room to move its neck inside the cattle-receiving station 16. With the additional freedom of movement, the cow is then able to more easily regain its footing and stand up within the confines of the cattle-receiving station.

When the cow regains its footing and stands up, then the top of the swing bar 14, including the locking mechanism 34 swings toward the depending tab 20 and locks automatically back into place. Consequently, an advantage of the present invention is that fallen cows are given room to regain their footing without release from the confines of the cattle-receiving station. The swing bar guide stop 132 is generally a U-shaped piece of extending metal that receives the swing bar 14 between the legs defined by its U-shape. This laterally stabilizes the swing bar 14 so that stress is not unduly inflicted upon the pivot 134 present between the swing bar spacer member 26 and the swing bar 14.

Thus, there has been disclosed a multiple stanchion structure that is of the type wherein cattle may be locked in position or at a station and wherein the individual swing bars may be adequately secured to obviate inadvertent opening or unlocking. In addition, there has been disclosed a means of modifying existing stanchion structures in order to make them into self-locking types, wherein cattle, once locked in position, are retained in the captive relationship until such time as it is desired to release them.

While the present invention has been described with regards to particular embodiments, it is recognized that additional variations of the present invention may be devised without departing from the inventive concept.

What is claimed is:

1. In multiple stanchion construction having vertically-spaced upper and lower horizontal support members, intermediate vertical support posts and spaced swing pipes defining spaced positions for accommodating cattle in spaced, captive relationship, the improvement which comprises: a turn bar extending the length of and operatively supported relative to said upper horizontal support member from each of said spaced swing pipes; a plurality of spaced locking tabs on said turn bar adjacent each of said swing pipes; a locking member pivotally supported from the upper terminii of each of said swing pipes and receiving said tabs, said locking member releasably entrapping said tabs and having a pair of oppositely opposed flipper blocks for releasably entrapping said tabs, said flipper blocks freely swinging to entrap said tabs but unable to swing in an opposite direction to release said tabs, said swing pipes and cooperating locking members being selectively positionable in a locked and unlocked position; and actuator means for the circular movement of said turn bar to simultaneously release each of said swing bars, having its associated locking member released by said adjacently positioned tab of said turn bar, into the unlocked position.

2. The construction in accordance with claim 1 wherein said locking members are gravity biased.

3. The construction in accordance with claim 2 wherein said swing pipes are tubular and circular in cross section.

4. The construction in accordance with claim 3 including a pair of spaced apart vertical ear members secured to the terminii of each of said swing pipes.

5. The construction in accordance with claim 4 wherein said vertical ear members have first and second pairs of spaced securement members, one pair of said securement members mounting said flipper blocks and the other pair restricting pivoting travel of said flipper blocks.

6. The construction in accordance with claim 5 wherein the lower portions of said vertical ear members are contoured to snugly fit the exterior configuration of said swing pipes.

7. The construction in accordance with claim 6 wherein said vertical ear members have a widened upper portion extending aside said locking member.

8. In cattle stanchion structure, the combination which comprises: vertically spaced upper and lower horizontal support members; vertical bracing and support members bracing and supporting said horizontal support members; spaced gate swing members and rigid vertical gate members defining therebetween a plurality of cattle-receiving stations for selectively and captively retaining cattle thereat, said gate swing members having an upper free end and a lower pivotally secured portion for swinging movement from approximately vertical to off vertical; a turn bar member overlying and extending the length of and operatively supported relative to said upper horizontal support member from the upper free ends of each of said gate swing members; a plurality of spaced locking tabs on said turn bar member conforming in number to and in proximity to each of said receiving stations; a locking member pivotally supported from each of said upper free ends of said gate swing members and being urged into engagement with said turn bar member and said plurality of spaced locking tabs when said gate swing members close, each of said locking members entrapping said locking tabs by restrictedly pivoting flipper blocks, and handle means secured through operative linkage to circularly move said turn bar member to simultaneously release each of said gate swing members, having its associated locking member released by the associated tab on said turn bar member, to an open position.

9. A cattle stanchion, comprising:
a rotatable turn bar having a depending tab;
a swing bar selectively entrapping said depending tab; and
a vertical post spaced apart from said swing bar; whereby said swing bar and said vertical post provide a captively-retaining cattle-receiving station, said swing bar selectively released from said turn bar by rotation of said turn bar.

10. The cattle stanchion of claim 9, wherein said swing bar further comprises:
first and second oppositely opposed and restrictedly pivoting flipper blocks, said flipper blocks selectively retaining said depending tab.

* * * * *